(12) United States Patent
Vachon et al.

(10) Patent No.: US 11,885,160 B2
(45) Date of Patent: Jan. 30, 2024

(54) SLIDING DOOR LOCKING DEVICE (71) Applicant: Westinghouse Air Brake Technologies Corporation, Wilmerding, PA (US)

(72) Inventors: Luc Vachon, Verdun (CA); Samuel Blanchard, Montbazon (FR); Frédéric Augé, Outremont (CA)

(73) Assignee: WESTINGHOUSE AIR BRAKE TECHNOLOGIES CORPORATION, Wilmerding, PA (US)

( * ) Notice: Subject to any disclaimer, the term of this patent is extended or adjusted under 35 U.S.C. 154(b) by 762 days.

(21) Appl. No.: 17/085,435

(22) Filed: Oct. 30, 2020

(65) Prior Publication Data

US 2021/0131151 A1 May 6, 2021

Related U.S. Application Data (60) Provisional application No. 62/929,172, filed on Nov. 1, 2019.

(51) Int. Cl.
*E05B 85/24* (2014.01)
*E05B 77/00* (2014.01)
(Continued)

(52) U.S. Cl.
CPC ............... *E05B 83/40* (2013.01); *B60J 5/062* (2013.01); *B60R 3/02* (2013.01); *E05B 77/00* (2013.01); *E05B 85/24* (2013.01); *B61D 19/003* (2013.01)

(58) Field of Classification Search
CPC ... B60J 1/16; B60J 5/062; E05B 83/40; E05B 85/24; E05B 83/363; E05B 83/42;
(Continued)

(56) References Cited

U.S. PATENT DOCUMENTS 4,901,474 A * 2/1990 Bayard ................ E05F 15/565
292/144
6,357,362 B1 3/2002 Krbec et al.
(Continued)

FOREIGN PATENT DOCUMENTS

| CN | 201390580 Y | * | 1/2010 | |
| CN | 114541892 A | * | 5/2022 | |
| JP | 2010090571 A | * | 4/2010 | ............... E05F 1/16 |

OTHER PUBLICATIONS

CN-114541892-A computer translation (Year: 2022).*
JP-2010090571-A computer translation (Year: 2010).*
CN-201390580-Y computer translation (Year: 2010).*

*Primary Examiner* — Amy R Weisberg
*Assistant Examiner* — Melissa Ann Bonifazi
(74) *Attorney, Agent, or Firm* — The Small Patent Law Group LLC; Christopher R. Carroll (57) ABSTRACT

A self-aligning locking device for a vehicle sliding door assembly includes a sliding door threshold configured to be mounted on a door panel. The threshold is configured to slide along a sliding axis. The threshold includes a latch and a tongue at a car body-engaging end of the latch. The locking device also includes a groove block and a hook plate both configured to be coupled to the car body. Optionally, the locking device can include a switch sensor. The tongue of the threshold is configured to engage the groove to maintain alignment of the hook plate to mate with the latch to lock the threshold to the car body. The optional switch sensor can be configured to generate a signal indicating a locked state of the hook with the latch responsive to actuation of the switch sensor by the latch.

22 Claims, 10 Drawing Sheets

(51) Int. Cl.
*B60R 3/02* (2006.01)
*B61D 19/00* (2006.01)
*B60J 5/06* (2006.01)
*E05B 83/40* (2014.01)

(58) Field of Classification Search
CPC .. B61D 19/002; B61D 19/003; B61D 19/005; B61D 19/006; Y10S 292/23; Y10S 292/46; B60R 3/02
USPC ............ 49/360; 296/155, 146.1, 146.9
See application file for complete search history.

(56) References Cited

U.S. PATENT DOCUMENTS

| | | | |
|---|---|---|---|
| 6,591,760 B2 | 7/2003 | Brunooghe et al. | |
| 7,360,823 B2* | 4/2008 | Nakayama | E05D 15/1005 296/146.12 |
| 8,328,270 B2* | 12/2012 | Kitayama | B60J 7/192 296/146.1 |
| 2021/0254373 A1* | 8/2021 | Suzaki | E05B 85/04 |

* cited by examiner

SLIDING DOOR LOCKING DEVICE

CROSS-REFERENCE TO RELATED APPLICATIONS

This application claims priority to U.S. Provisional Application No. 62/929,172, which was filed on 1-Nov.-2019, and the entire disclosure of which is incorporated herein by reference.

BACKGROUND

Technical Field

The subject matter described herein relates to assemblies that secure mobile thresholds of sliding doors to a base surface. While embodiments of the subject matter described herein relate to using the assemblies in connection with sliding doors of vehicles, not all embodiments are limited to vehicle door assemblies.

Discussion of Art

In some door systems accommodating high or low platform boarding implementations, a sliding threshold may have significant play both in the vertical direction (up and down) and in the inboard/outboard horizontal direction. This play is caused by multiple sources such as a door panel sliding door (holding the sliding threshold) being held by a suspension at the top and constrained at the bottom by a guide that slides in a slit of the lower threshold. Both the suspension and the bottom guide may not be perfectly tight, parallel, and adjusted with accurate synchronization with a fixed door post locking device. This can allow an inboard/outboard play of the door panel which can be in the order of several millimeters.

The play also can be caused by a slide mounted in the door panel to allow sliding movement of the sliding threshold not being perfectly rigid and allowing some play between the sliding threshold and the door panel. The play can also be caused by parts movement and deformations when passengers step on the threshold.

Frequently, the location of the door panel with respect to the car body doorway opening does not correspond to the ideal design location. This can be due to departures from nominal dimensions of the car body and imperfect adjustment of the door system in the doorway. As a result, an abutment of the sliding threshold end with the car body doorway post can be subject to a certain level of dimensional play each time a door closes, driving the embedded sliding threshold with it. In turn, this play may prevent correct operation of the lock joining the sliding threshold to the car body post.

BRIEF DESCRIPTION

In one embodiment, a self-aligning locking device for a vehicle (e.g., transit vehicle) sliding door assembly includes a sliding door threshold configured to be mounted on a door panel. The threshold is configured to slide along a sliding axis that is substantially horizontal and parallel to faces of the door panel. The threshold includes a latch and a tongue at a car body-engaging end of the latch. The locking device also includes a groove block and a hook plate both configured to be coupled to the car body. Optionally, the locking device can include a switch sensor. The tongue of the threshold is configured to engage the groove to maintain alignment of the hook plate to mate with the latch to lock the threshold to the car body. The optional switch sensor can be configured to generate a signal indicating a locked state of the hook with the latch responsive to actuation of the switch sensor by the latch.

BRIEF DESCRIPTION OF THE DRAWINGS

The inventive subject matter may be understood from reading the following description of non-limiting embodiments, with reference to the attached drawings, wherein below:

FIG. 8 (which includes FIGS. 8A and 8B) illustrates vertical alignment of the self-aligning locking device shown in FIG. 1;

DETAILED DESCRIPTION

Embodiments of the subject matter described herein relate to sliding door locking assemblies that provide a more dependable locking mechanism for a sliding threshold of a sliding door assembly under wider variations in mechanical interfaces and adjustments between the sliding threshold and the door panel. One or more embodiments provide a protection system that detects a status of the locking mechanism to prevent or avoid a door panel opening when the sliding threshold is not locked and to stop the door panel from opening if the sliding threshold unlocks during the opening of the door panel. The protection system optionally can monitor a lock sensor to detect and report faults with the assembly.

The assembly can ensure a repeatable door locking process with minimal or reduced probability of malfunction given the horizontal and vertical play of the sliding threshold with respect to the body or surface to which the assembly is coupled (e.g., the body of a vehicle, or car body). This repeatability can ensure safety of passengers boarding and alighting the vehicle. The locking device can include a self-aligning arrangement between the sliding threshold and the car body.

Figure 1:
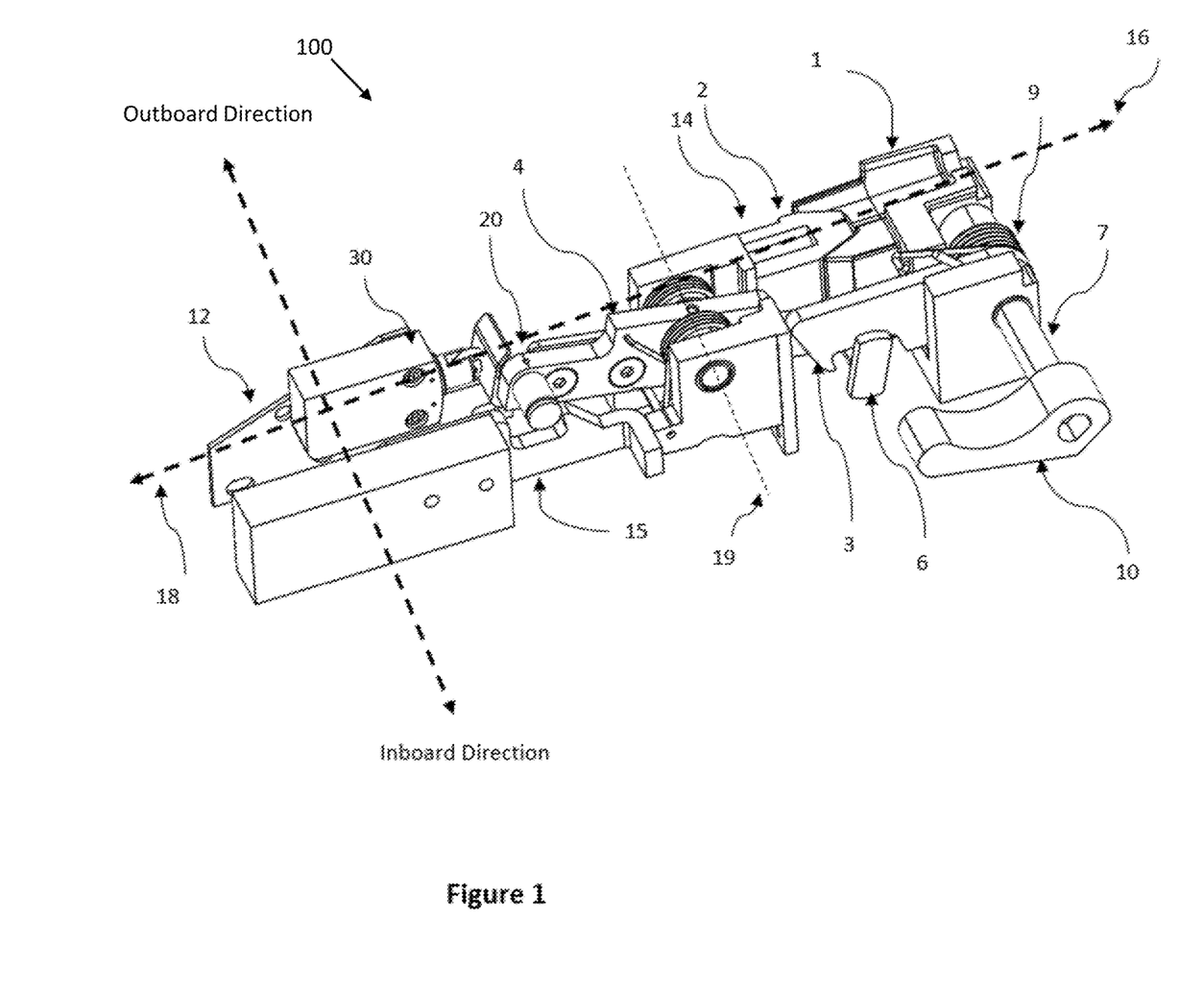
FIG. 1 illustrates a perspective view of a self-aligning locking device.

FIG. 1 illustrates a perspective view of one example of a sliding door locking device 100. The locking device includes a multi-piece tongue-and-groove device having a groove block 1 disposed on a door post 13 (shown in FIG. 3). The groove block can be coupled to or affixed to the body of a vehicle (e.g., a car body) by the door post. A tongue 2 of the tongue-and-groove device is disposed at an abutment end 14 of a sliding threshold 12 of the locking device.

Figure 6:
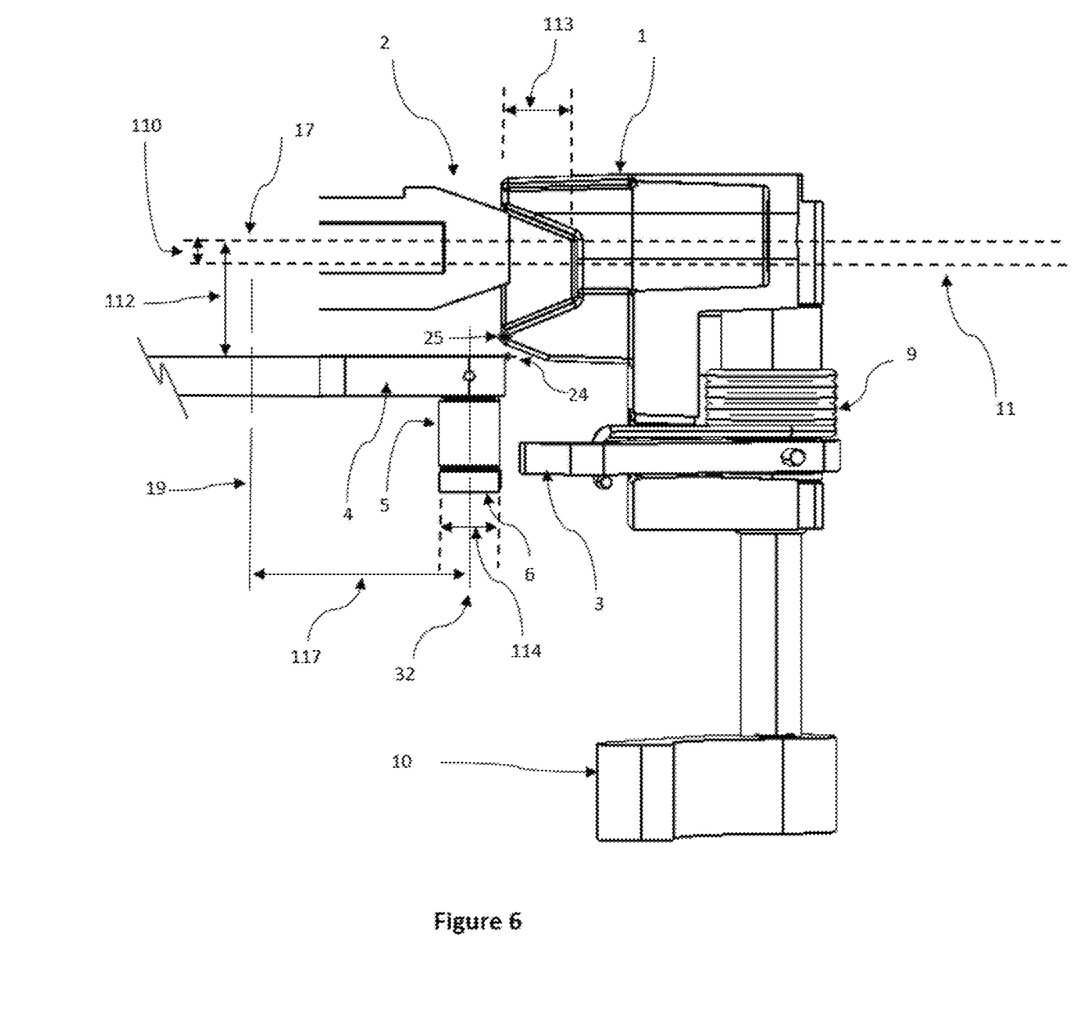
FIG. 6 illustrates outboard alignment of the self-aligning locking device shown in FIG. 1.

A latch 4 can be located in a plane that is parallel or substantially parallel to a sliding axis 18 of the sliding threshold. For example, this plane can be parallel or within fifteen degrees of being parallel to the sliding axis. As shown in FIG. 6, this plane can be a fixed distance 112 from a centerline 17 of the tongue 2. The latch 4 has a rotation axis 19 at a right angle from the latch and fixed to the sliding threshold 12.

Figure 2:
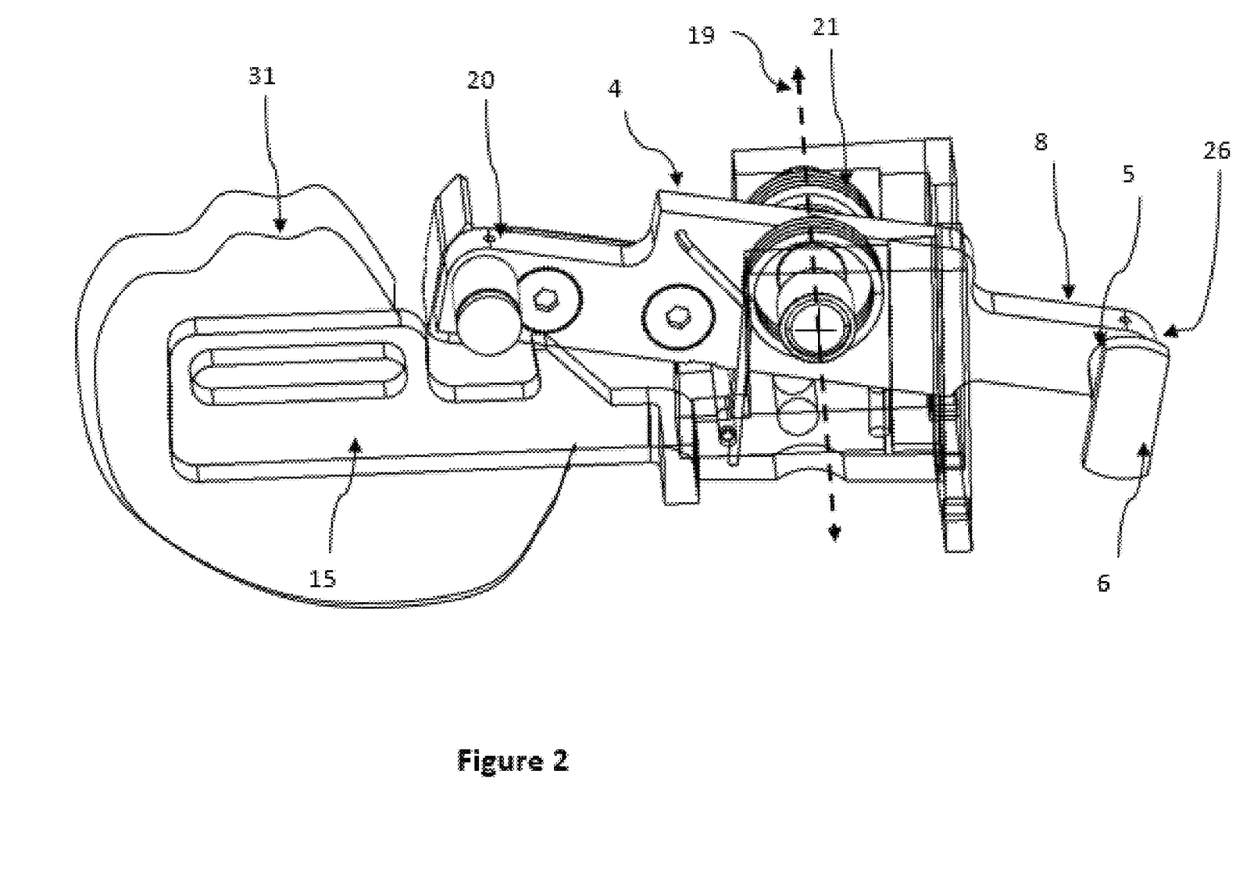
FIG. 2 illustrates a perspective view of a latch of the self-aligning locking device shown in FIG. 1.

This latch 4 has a car body-engaging end 8 (shown in FIG. 2) that engages the car body and a door-panel-engaging end 20 that engages a door panel 31. These ends 8, 20 are disposed at opposite ends of the latch 4 and/or on opposite sides of the latch axis 19. The latch 4 can be biased with a resilient body 21, such as a torsion spring. This resilient body can bias the latch so that in a rest or non-actuated position, the door-panel-engaging end 20 is engaged with a door panel catch 15 (shown in FIG. 4) tied or otherwise connected to the door panel 31. In this rest position, the sliding threshold 12 is driven by movement of the door panel.

The car body-engaging end 8 of the latch 4 includes a protrusion 5 that extends from the end 8 of the latch 4 in or along a direction or axis that is at a right angle with respect to the direction or axis that the latch 4 is elongated. For example, the protrusion can be elongated and extend from the latch 4 in a direction that is parallel to the inboard and outboard directions (e.g., the directions in which passengers get on board the vehicle and get off the vehicle, respectively). In one embodiment, this protrusion is a pin.

An outer end of the protrusion is coupled with a retention plate 6. This plate 6 can prevent a hook plate 3 from disengaging from the pin 5. For example, the retention plate is sized and oriented in a plane that prevents the hook plate from moving farther than the retention plate in a direction that is along or parallel to the inboard direction.

Figure 3:
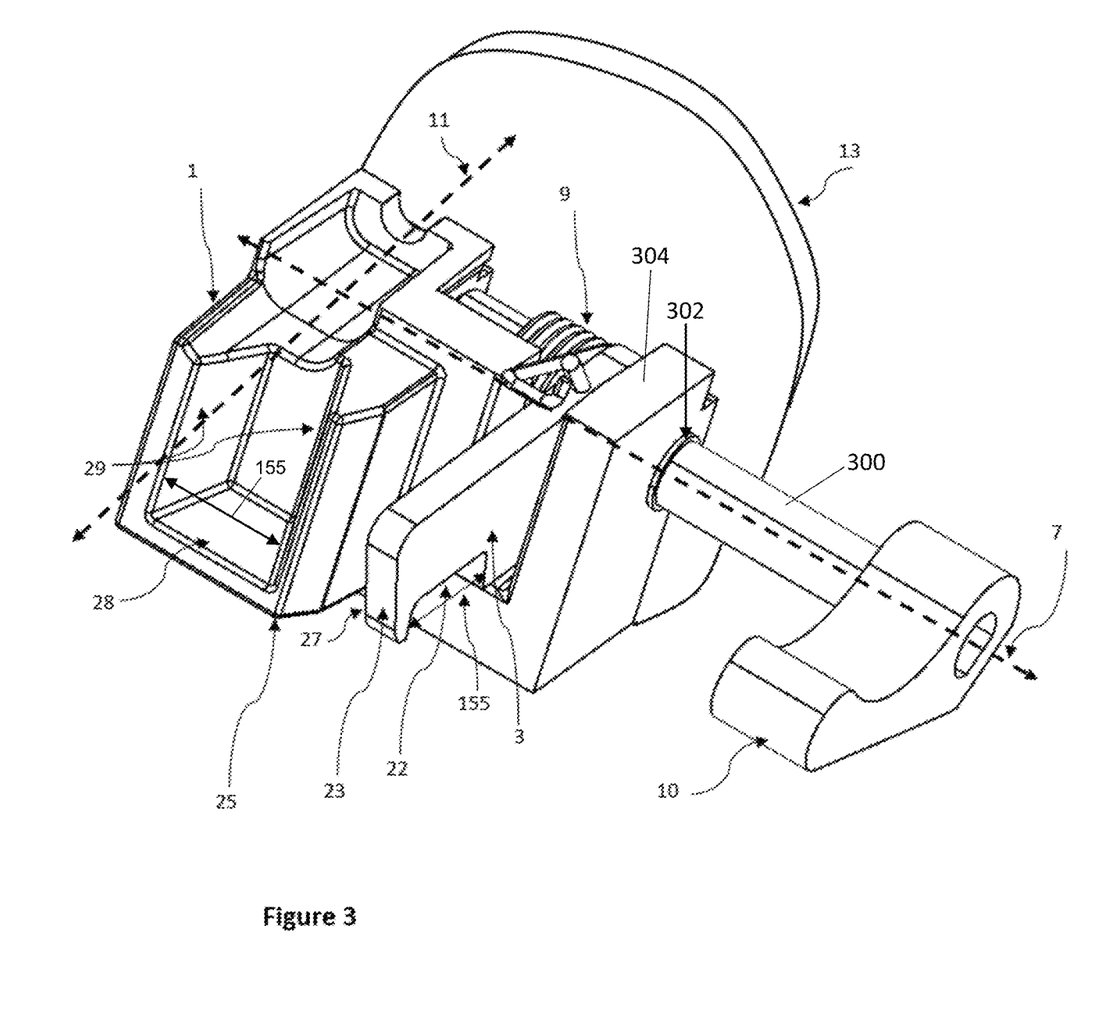
FIG. 3 illustrates a groove block of the self-aligning locking device shown in FIG. 1.

The hook plate 3 (as shown in FIG. 3) can extend in multiple directions in a plane that is parallel or substantially parallel to the sliding axis 18 of the sliding threshold 12. The hook plate 3 extends to a hook plate engaging end 23. This engaging end 23 may extend over and latch onto the pin 5 in the position or state shown in FIG. 4. The hook plate 3 is joined with a cylinder or pin 300 that is disposed in an opening or channel 302 of a bracket 304 (shown in FIG. 3). This bracket is coupled with the car body door post 13. The cylinder or pin 300 rotates within this opening or channel 302 to allow the hook plate 3 to pivot about or around a rotation axis 7. This axis 7 is oriented at a right angle to the plane in which the hook plate 3 extends.

Figure 7:
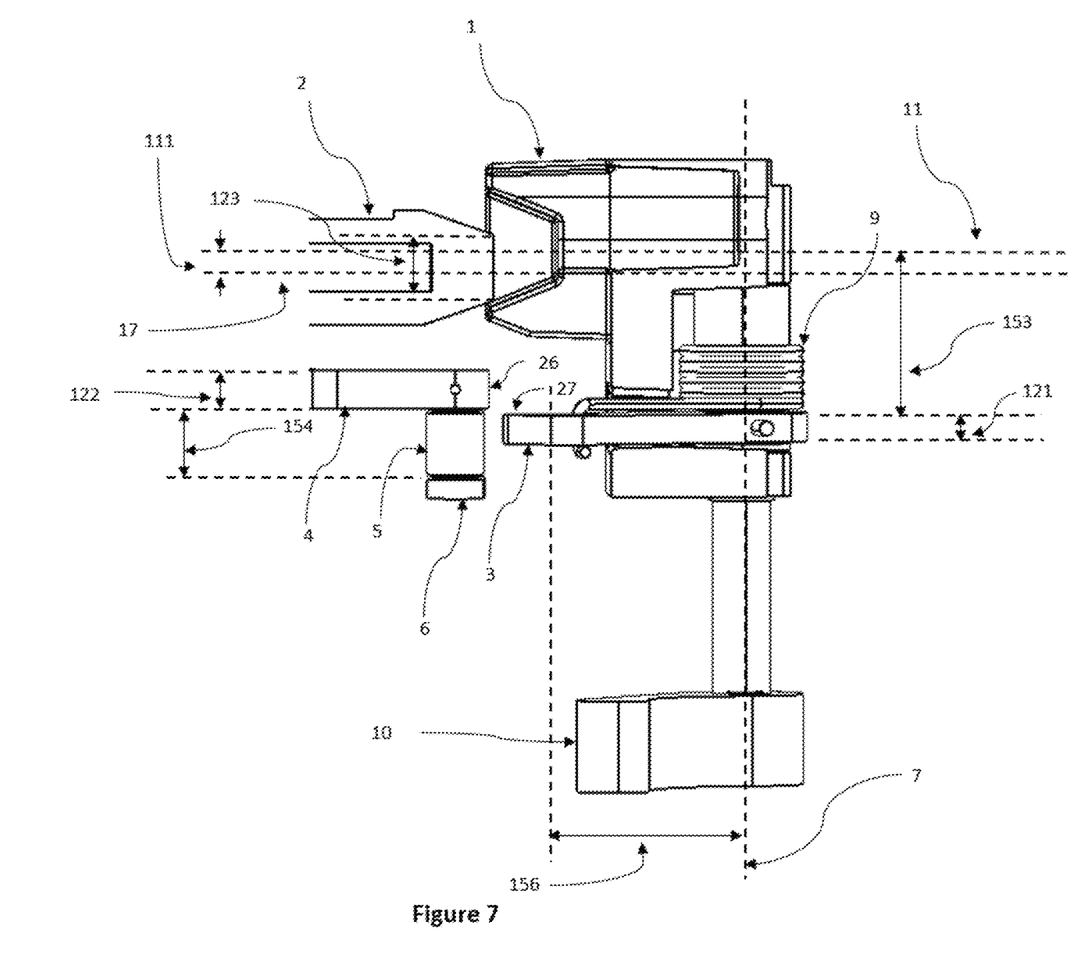
FIG. 7 illustrates inboard alignment of the self-aligning locking device shown in FIG. 1.

As shown in FIG. 7, the hook plate 3 is located at a fixed and controlled distance 153 with respect to the centerline 11 of the groove block 1. This hook plate 3 is biased by a resilient body 9 (e.g., a torsion spring). The resilient body 9 maintains the hook plate 3 in a disengaged position.

The hook plate 3 has a lever 10 acting on the rotation axis 7 of the hook plate 3. The lever 10 is engaged by a trap door (not shown) when deployed in the horizontal plane. In this position of the trap door, the lever 10 drives the hook plate 3 to rotate (counterclockwise in FIG. 3) about the axis 7 and to move the notch 22 (shown in FIG. 3) to catch or otherwise engage the pin 5 located at the car body-engaging end 8 of the latch 4. When the trap door is raised in the vertical plane, disengaging the lever 10, the hook plate 3 rotates (clockwise in FIG. 3) driven by the resilient body 9, causing the latch 4 to rotate about the axis 19 and disengage the latch 4 from a door panel catch 15 at the door-panel-engaging end of the latch 4.

The hook plate-engaging end notch 22 is constrained between the body of the latch 4 on one side and the retention plate 6 on the other side. For example, movement of the hook plate 3 and the hook plate-engaging notch 22 in directions parallel to the inboard and/or outboard directions is restricted to between the latch 4 and the retention plate 6. This prevents the plate-engaging end notch 22 from slipping out of the pin 5 due to shocks and vibrations as well as movements created by passenger loads during transit.

Figure 4:
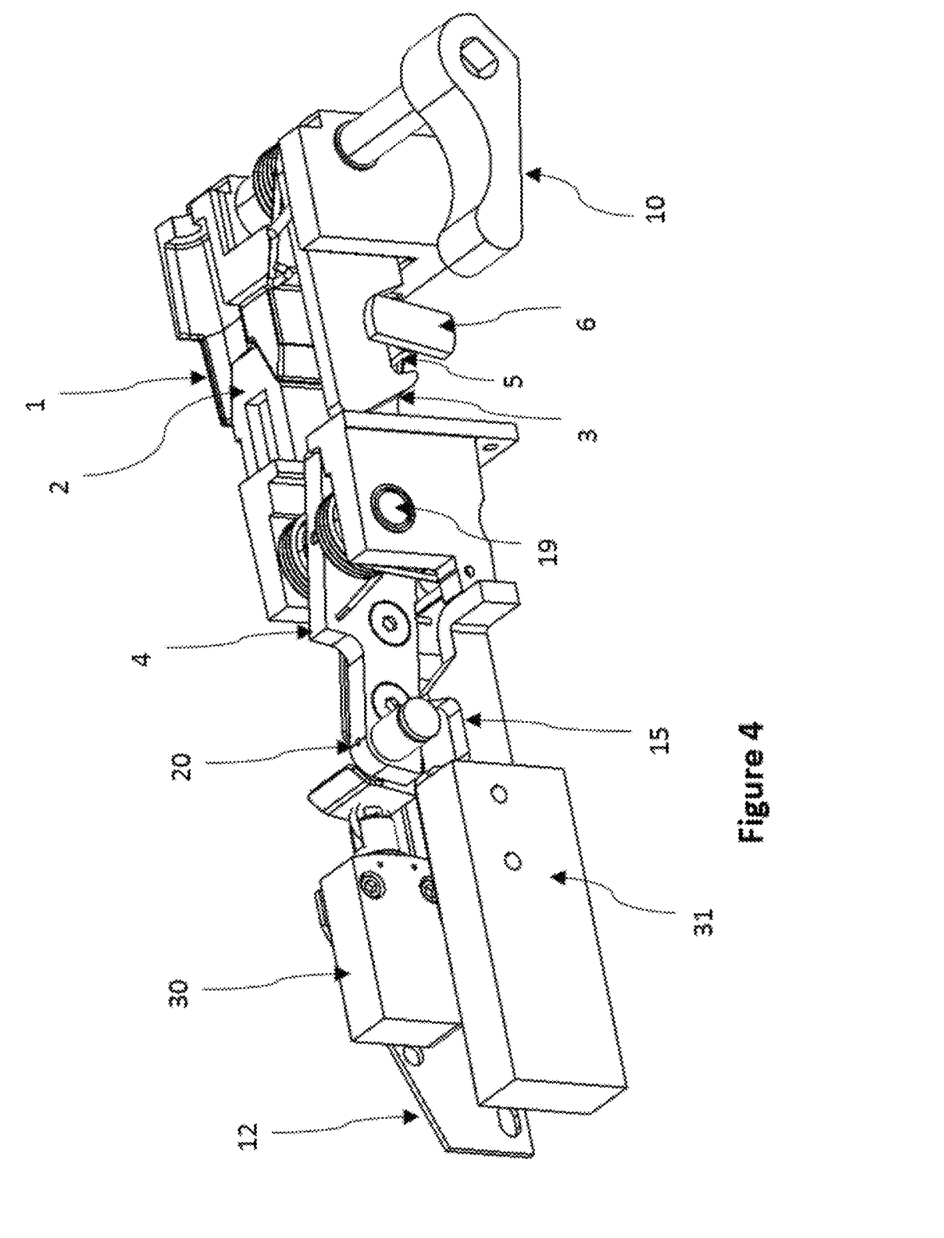
FIG. 4 illustrates the self-aligning locking device shown in FIG. 1 in an engaged state.
Figure 5:
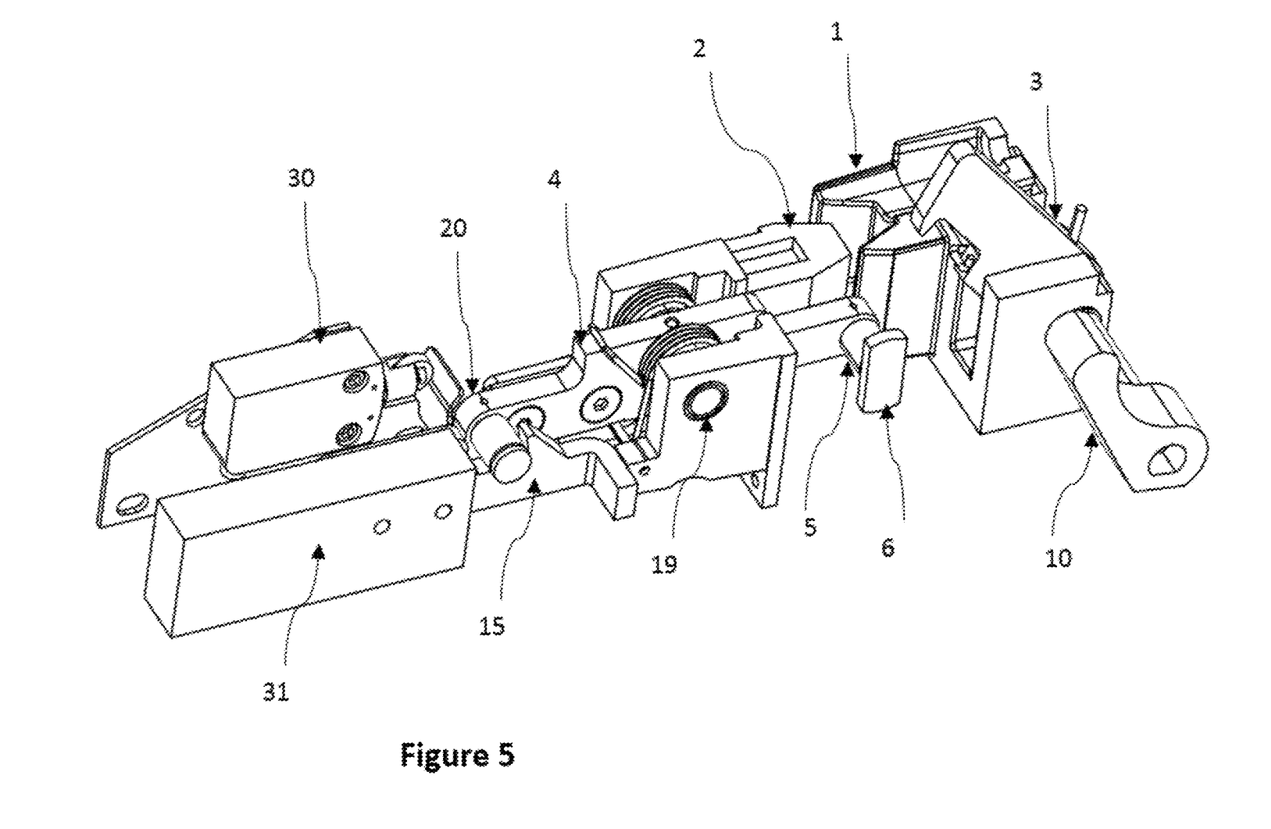
FIG. 5 illustrates the self-aligning locking device shown in FIG. 1 in a disengaged state.

FIG. 4 illustrates the locking device with the hook plate 3 engaged with the pin 5 and the latch 4 disengaged from the door panel 31 at the door panel-engaging end 20 of the latch 4. FIG. 5 illustrates the locking device with the hook plate 3 disengaged from the pin 5 and the latch 4 engaged with the door panel 31 at the door panel-engaging end 20 of the latch.

As the sliding threshold 12 moves along with the door panel 15 in a door closing direction 16, the tongue 2 meets with the groove block 1, as shown in FIG. 1. As the tongue 2 enters the groove block 1, the centerline 17 of the tongue 2 will become juxtaposed to the centerline 11 of the groove block 1, as shown in FIG. 6. In this position, the latch 4 is located at a fixed distance 112 from the centerline 17 of the tongue 2 and the hook plate 3 also at another fixed distance 153 from the centerline 11 of the groove block 1 to become properly aligned and engage one another.

FIG. 6 illustrates an extreme outboard alignment state of the locking device. In this state, the tongue 2 is at a maximum or farthest outboard position (along the outboard direction) when the tongue 2 meets with the groove block 1. FIG. 7 illustrates an extreme inboard alignment state of the locking device. In this state, the tongue 2 is at a maximum or farthest inboard position (along the inboard direction) when the tongue meets with the groove block 1.

Figure 8A:
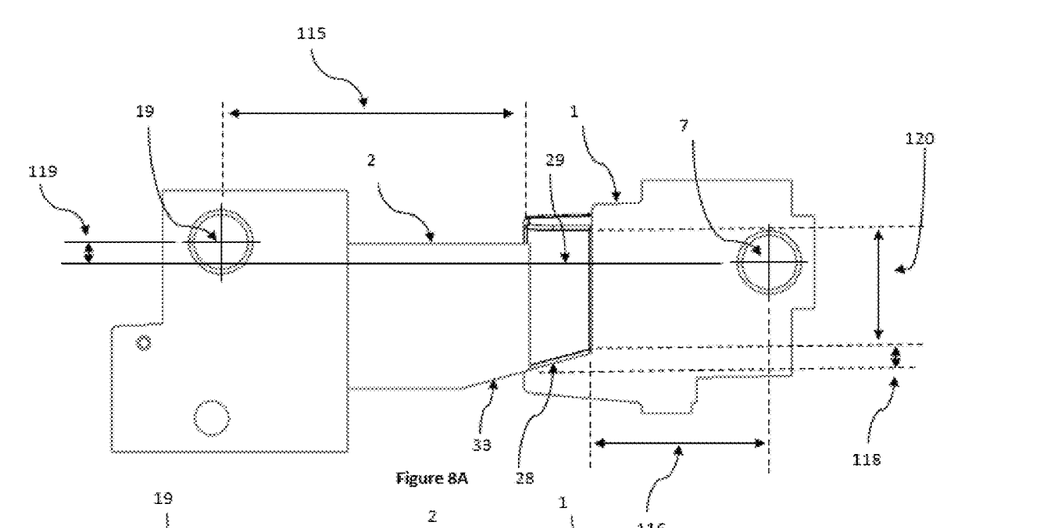
Figure 8B:
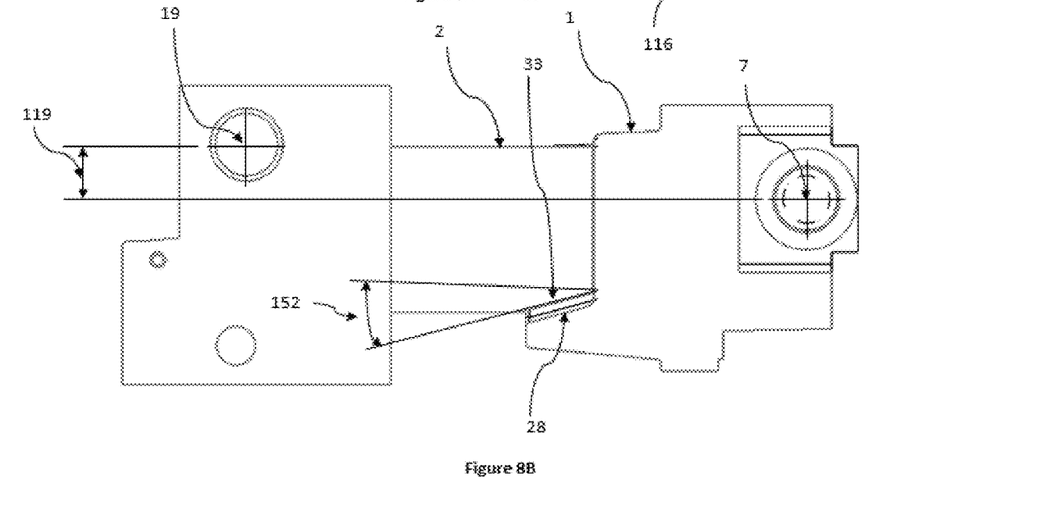

FIG. 8 (which includes FIGS. 8A and 8B) illustrates an abutment process where the car body-engaging end of the sliding threshold is driven to its nominal mating position concurrently with the inboard-outboard alignment. This is shown in FIG. 8 where an alignment process takes place in the vertical direction at the same time as the horizontal engagement of the tongue 2 in the groove block 1. In FIG. 8, a distance D20 (118 in FIG. 8) represent the maximum or upper limit on vertical movement (e.g., play) of the sliding threshold 12. As shown in FIG. 8, a floor 28 of the groove block 1 is at an angle Theta 152 with respect to the horizontal plane such that the vertical projection of this angle at the engaging end of the groove block 1 equals the distances D20 (118 in FIG. 8). The tongue 2 can have a tapered shape 33 at a bottom side of the tongue that mates with the groove block 1 when fully engaged.

The nominal vertical mating position can be reached when a nominal distance D21 (119 in FIG. 8) in the vertical plane between the latch axis 19 and the hook plate axis 7 is reached, as shown in FIG. 8B. This condition is set to be met when the tongue is completely mated with the groove block. In this position or state, a small vertical gap between a floor 28 of the groove block 1 and the tapered shape 33 of the tongue 2 remains to avoid raising the tongue 2 too much. Raising the tongue 2 more than this distance could drive the door panel upward, which may not be desirable. The sliding threshold 12 will slightly deflect when passengers step on the sliding threshold 12. This force caused by passengers' steps can eliminate the vertical gap. The floor 28 of the groove block 1 can operate as a vertical end stop to movement of the sliding threshold 12 that is caused by this force.

A distance D22 (120 in FIG. 8) represents a vertical depth of the groove block at the bottom (e.g., the distance taken at bottom of groove from top of block to floor of groove block).

This distance D22 is set or fixed so that tapered vertical surfaces 29 of the groove block 1 are large enough to stand the pressure in the inboard-outboard directions between the tongue 2 and the groove block 1 caused by the rectified sliding threshold position bias and the inboard-outboard pressure generated by the passengers walking on the sliding threshold.

A distance D1 (110 in FIG. 6) represents the maximum horizontal play or movement of the sliding threshold 12 with respect to the nominal (e.g., centered) position shown in FIG. 6. A distance D2 (111 in FIG. 7) represents the maximum inboard horizontal play of the sliding threshold 12 with respect to the nominal position (shown in FIG. 7). The distance D4 (112 in FIG. 6) can represent the distance between the centerline of the tongue 2 and the latch 4. The distance D3 (113 in FIG. 6) represents the horizontal depth of the groove. This distance D3 also is the distance between the rotation axis 32 of the pin 5 and the center of hook plate 3 notch 22 when the tip of the tongue 2 just meets the groove. The distance D6 (114 in FIG. 6) represents the diameter of the pin 5. The distance D7 (115 in FIG. 8A) represents the distance from the tip of tongue 2 to the rotation axis 19 of the latch 4.

The distance D8 (116 in FIG. 8A) represents the distance from the bottom of the groove block 1 to the rotation axis 7 of the hook plate 3. The distance D9 (117 in FIG. 6) represents the distance from the rotation axis 19 of the latch 4 to the axis of pin 5. The distance D20 (118 in FIG. 8A) represents a maximum vertical play of the sliding threshold 12 with respect to the nominal position.

A distance D21 (119 in FIG. 8A) represents a distance in the vertical direction or vertical plane between the axis 19 of the latch 4 and the axis 7 of the hook plate 3. A distance D22 (120 in FIG. 8A) represents a vertical depth of the groove block at the bottom of the groove block. For example, the distance D22 is measured from the top to the floor of the groove block.

A thickness T1 (121 in FIG. 7) represents a thickness of the hook plate 3. A thickness T2 (122 in FIG. 7) represents a thickness of the latch 4. A thickness T3 (123 in FIG. 7) represents a thickness of the tip of the tongue 2 (e.g., the portion of the tongue that engages the bottom surface of the groove in the groove block).

A switch sensor 30 can be fixed to the sliding threshold 12, as shown in FIG. 4. This switch sensor 30 can be positioned to be actuated by the door panel-engaging end 20 of the latch 4 when the latch 4 is engaged with the notch 22 of the hook plate 3. The switch sensor 30 generates an electric signal responsive to the switch sensor 30 being actuated by the end 20 of the latch 4. This signal can be communicated (e.g., conducted via one or more wires, busses, etc., or wirelessly communicated) to another device, such as a controller, processor(s), a light, alarm, or the like, to determine whether the latch is engaged or disengaged. Receipt of this signal can indicate or confirm that the sliding threshold 12 is locked in place to the car body. It can be used in a door interlock circuit to allow opening of the door in high boarding configuration only when safe to do so. The switch is preferably of the weld-no-transfer dual contact type so that a first contact is wired-up to the interlock circuit and the second contact is wired-up to a monitoring circuit to allow detection of any switch failure.

Optionally, the locations of the groove block 1 and the tongue 2 may be switched from those shown in the Figures. For example, the tongue 2 could be fixed to the car body and the groove block 1 could be fixed to the car body-engaging end of the sliding threshold 12. The pin 5 on the latch 4 could be swapped with the hook plate 3 and the pin of the door panel-engaging end 20 of the latch 4 could be fitted with a retention plate similar to the retention plate 6.

The geometry and dimensions of components of the locking device can be restricted to certain absolute or relative values to ensure that the locking device operates properly. For example, a distance D4 (112 in FIG. 6) can extend from the centerline of the tongue 2 to the latch 4 and a distance D9 (117 in FIG. 6) can extend from the rotation axis 19 of the latch 4 to the rotation axis of the pin 5. These distances D4, D9 can be selected so that, when the tongue 2 engages the groove block 1 from the outboard side, an outboard tip 24 of the latch 4 does not interfere with an inboard tip 25 of the groove block 1 (shown in FIG. 6) and/or the retention plate 6 of the pin 5 does not interfere with the inboard tip of the hook plate 3 (shown in FIG. 6). To reduce, minimize, or eliminate this possibility, the width of the retention plate 6 can be oriented parallel to the sliding axis 18 and be no larger than the diameter of the pin 5. The distances D4, D9 may be selected so that, when the tongue 2 engages the groove block 1 from the inboard side, a tip 26 of the car body-engaging end of the latch 4 does not interfere with an outboard end 27 of the hook plate 3 (shown in FIG. 7).

A thickness T1 of the hook plate 3 may be restricted to being smaller than the length L of the pin 5. This length L of the pin 5 can increase as a distance D5 (113 in FIG. 6) increases. There may be an upper limit to the length L of the pin 5 since it may be desirable to have the pin 5 and retention plate 6 entirely contained within the sliding threshold 12. Therefore, the distance D5 may be sufficiently short to ensure that the pin 5 and retention plate 6 do not move or extend outside of the sliding threshold 12. But, the distance D5 may need to be large enough to provide enough inboard-outboard retention strength to prevent damage or movement of the sliding threshold.

Figure 9:
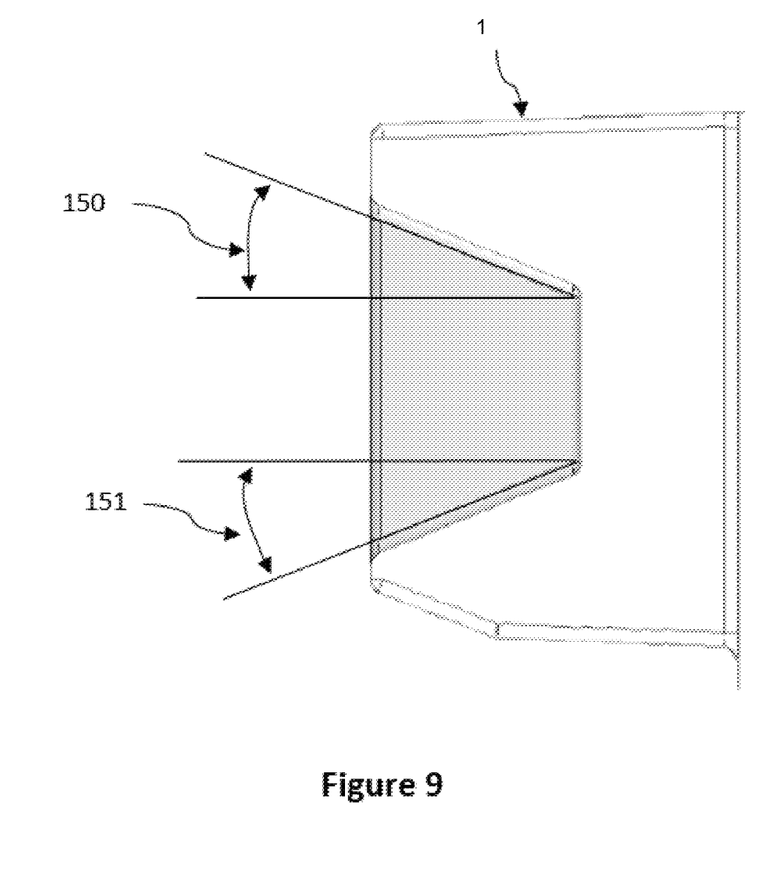
FIG. 9 illustrates a groove block of the self-aligning locking device shown in FIG. 1.

FIG. 9 illustrates a groove block of the self-aligning locking device shown in FIG. 1. The hook plate of the groove block includes a first alpha angle 150 that matches an outboard section of the tongue 2. For example, this first alpha angle may correspond to or be complementary to the surface of the tongue that engages the hook plate within the first alpha angle. The first alpha angle may be the inverse tangent of the ratio between the distance D1 to the distance D5. The groove block also includes a first beta angle 151 that matches an inboard section of the tongue. For example, this first beta angle may correspond to or be complementary to the surface of the tongue that engages the hook plate within the first beta angle. The first beta angle may be the inverse tangent of the ratio between the distance D2 to the distance D5.

A width 155 (W) of the hook plate is shown in FIG. 3. This width 155 may be longer than the diameter 114 (D6) of the pin 5 (shown in FIG. 6). This can ensure that the notch 22 engages the pin 5 given dimensional tolerances of the components, as well as movements of the latch 4 (e.g., resulting from or caused by loading of passengers during transit).

As shown in FIG. 7, a first length 154 of the pin 5 may represent a minimum length of the pin 5 that is needed to ensure engagement of the hook plate 3 to the pin 5 from both worst cases of the tongue engaging the groove from the most outboard position and the tongue engaging the groove from the most inboard position. The first length 154 of the pin 5 may be determined from a relationship between the distance 113 (D5) and angles alpha 150 and beta 151. As described above, the alpha angle 150 can represent an angle of the groove block that matches an outboard section of the tongue 2 and the beta angle 151 can represent another angle of the groove block that matches an inboard section of the tongue. The first length 154 of the pin 5 can be determined as a sum of (a) the product of the distance D5 and a sum of the tangent of the alpha angle and the tangent of the beta angle and (b) a thickness 121 (T1) of the hook plate. For example, the first length 154 (L) of the pin 5 may be determined from:

$$L=D5*(\tan(\alpha)+\tan(\beta))+T1$$

Also shown in FIG. 7, a distance 156 (D10) between the rotation axis 7 of the hook plate 3 and the center of the notch 22 (FIG. 3). This distance 156 can be a difference between (a) the sum of the distances 115, 116 (D7, D8) and (b) the distance 117 (D9) to ensure that the notch 22 engages the pin 5 at a center of the notch 22 (or that the pin 5 engages the notch 22 at the center of the notch 22).

Figure 10:
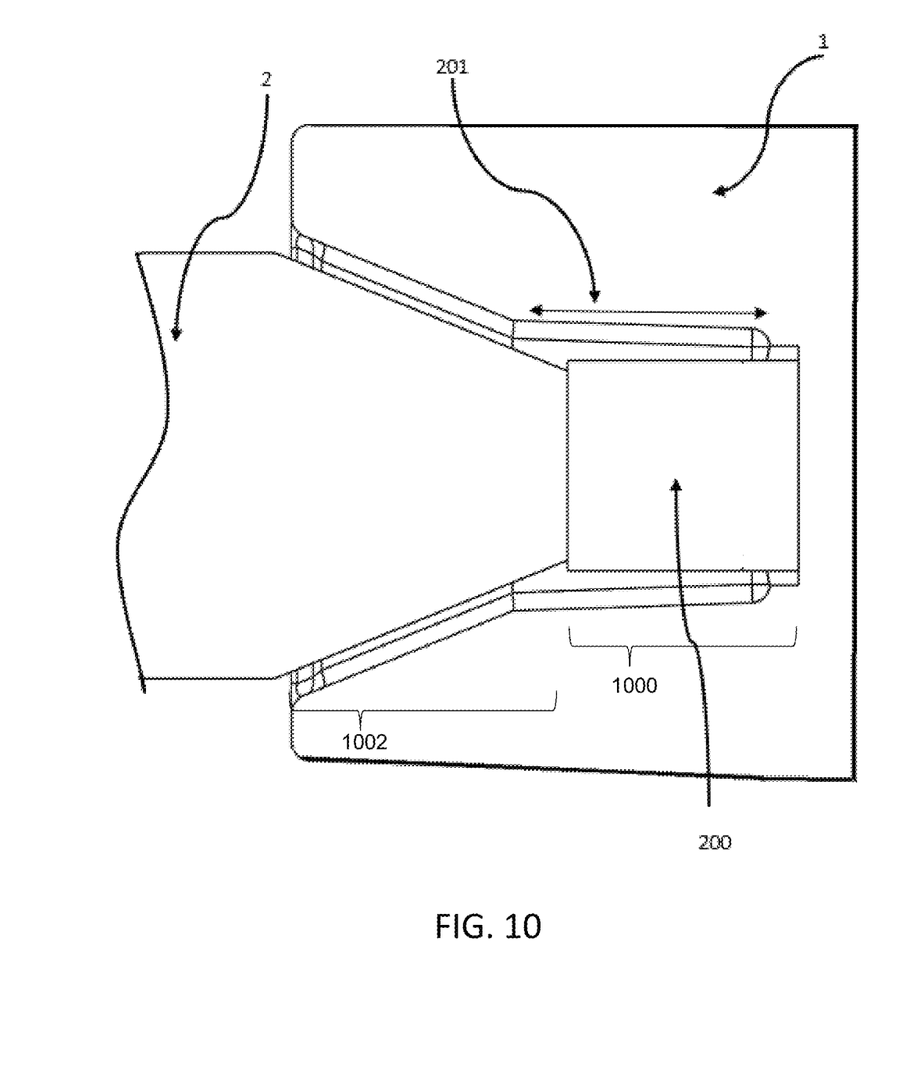
FIG. 10 illustrates another embodiment of the groove block.

FIG. 10 illustrates another embodiment of the groove block 1. In this embodiment, the groove block 1 includes a cavity 1000 that extends inward into the groove block 1 from a tapered shape or portion 1002 of the groove block 1. Additionally, the groove block 1 may include a bumper 200 that fills the cavity 1000 at least partially and is fastened to the groove block 1. The cavity 1000 can be positioned and/or shaped to receive the bumper 200. For example, a depth 201 of the cavity 1000 can be as long as or longer than a length of the bumper 200.

The bumper 200 can be made of a resilient material (e.g., rubber) or may be another resilient body (e.g., a spring). The bumper 200 can absorb or at least partially absorb shock resulting from mating of the tongue 2 with the groove block 1. The dimensions of the bumper 200 can be set so that, when mated, the tongue 2 is in contact with the bumper 200. The bumper 200 then takes at least some of the load in the door closing direction 16, thus relieving the tapered vertical surfaces 29 of the groove block 1 from taking the full load. This allows a better shock load transfer to the car body door post 13.

The locking assemblies described herein can provide self-aligning locking devices for vehicles, such as a transit vehicle, material handling or transport vehicles, theme park vehicles or rides, personal use vehicles, and so on. The locking assemblies can include the sliding door threshold mounted on a door panel. This threshold can be allowed to slide along a sliding axis that substantially horizontal, parallel to door panel faces, and fitted with a latch and with a tongue at a car body-engaging end. The locking device can include a groove block fixed on the car body and a hook plate fixed on the car body. Optionally, the locking device can include a sensor switch (or switch sensor). The locking device can precisely position the sliding threshold with respect to the car body by engaging the tongue with the groove so that the hook is properly aligned to mate with the latch and thus to lock the sliding threshold to the car body. The locking device can provide an indication or signal of such a locked state by actuation of the switch sensor.

The latch can be located in a plane that is substantially parallel to the sliding axis of the locking device. The latch can be joined to the sliding threshold by a joining axis that is oriented at right angle from the sliding axis. The latch can rotate about this joining axis. The latch also has a car body hook engaging end and a door panel engaging end. These two ends can be disposed on opposite sides or ends of the joining axis. The latch can be biased by a spring so that, in a default or biased position, the door panel-engaging end of the latch is engaged with the door panel and the latch pivots on the joining axis and disengages the latch from the door at the door-panel-engaging end when the car body hook plate engages the car body-hook-engaging end of the latch.

The groove block can have a three-dimensional groove defined by several surfaces. These surfaces can include a bottom (optionally flat) surface substantially oriented at right angle from the sliding axis and having a width and a height. The surfaces of the groove can include a first surface of a defined width and substantially the same height as the bottom surface from the outboard edge of the bottom surface and projecting at a first angle in the outboard direction. The surfaces of the groove can include a second surface of a defined width and substantially the same height as the bottom surface and starting from the inboard edge of the flat bottom and projecting at a second angle in the inboard direction. The surfaces of the groove can include an inclined floor surface that starts from the lower edge of the bottom surface, extends at an angle away from the flat bottom surface, and meets with the first and second surfaces. Several additional surfaces can generate or define a volume from the surfaces defined above to allow fixing the locking device to the car body.

The first and second surfaces can be large enough to withstand the pressure loads generated by use of the locking device in situations where passengers onboarding and moving off-board a vehicle step onto the locking device. The groove can include inboard and outboard tapers that are sufficiently wide to compensate for the worst-case horizontal play of the application and a bottom taper sufficiently high to compensate for the worst-case vertical play.

The tongue of the locking device can have a shape that substantially conforms to the shape of the groove when the tongue is fully mated with the groove.

The latch can have a pin located at a car body hook engaging end of the latch. The pin can be elongated along a rotation axis that is oriented at a right angle from the sliding axis of the sliding threshold. The pin can extend to a tip with a retention plate oriented substantially at right angle from the pin axis and having a width parallel to the sliding axis no longer than the pin diameter.

The pin can have a minimum length determined by the depth of the groove, the maximum outboard and inboard horizontal play of the sliding threshold, and the thickness of the hook plate. The pin can have a mid-point determined by the distance between the sliding axis and the latch, the thickness of the latch, the maximum outboard horizontal play of the sliding threshold, and the depth of the groove.

The hook plate can be located at a distance from the sliding axis so that the centerline of the hook plate is aligned or lines-up with the mid-point of the pin when the tongue and the groove are fully mated. The hook can include a notch that receives or catches the pin. The notch width can be at least as large as the diameter of the pin. The hook plate can have a thickness that is smaller than the minimum length of the pin. The hook plate can be biased with a spring so that the default or rested position of the hook plate has the notch disengaged from the pin.

The switch sensor can be located so that the sensor is actuated by motion of the latch when the sliding threshold has achieved lock with the car body by engagement of the hook plate notch with the pin.

The locking device can be a self-aligning device with the distance between the centerline of the tongue and the latch and the distance from the rotation axis of the latch and the axis of the pin at the car body-engaging end of the latch being selected or defined so that the hook plate will not interfere with the pin retention plate or the latch tip when the tongue engages the groove and the tip of the latch will not interfere with the groove block when the tongue engages the groove.

The singular forms "a", "an", and "the" include plural references unless the context clearly dictates otherwise. "Optional" or "optionally" means that the subsequently described event or circumstance may or may not occur, and that the description may include instances where the event occurs and instances where it does not. Approximating language, as used herein throughout the specification and claims, may be applied to modify any quantitative representation that could permissibly vary without resulting in a change in the basic function to which it may be related. Accordingly, a value modified by a term or terms, such as "about," "substantially," and "approximately," may be not to be limited to the precise value specified. In at least some instances, the approximating language may correspond to the precision of an instrument for measuring the value. Here and throughout the specification and claims, range limitations may be combined and/or interchanged, such ranges may be identified and include all the sub-ranges contained therein unless context or language indicates otherwise.

This written description uses examples to disclose the embodiments, including the best mode, and to enable a person of ordinary skill in the art to practice the embodiments, including making and using any devices or systems and performing any incorporated methods. The claims define the patentable scope of the disclosure, and include other examples that occur to those of ordinary skill in the art. Such other examples are intended to be within the scope of the claims if they have structural elements that do not differ from the literal language of the claims, or if they include equivalent structural elements with insubstantial differences from the literal language of the claims.

What is claimed is:

1. A locking device for a vehicle sliding door assembly, the locking device comprising:
    a sliding door threshold configured to be mounted on a door panel of a vehicle, the threshold configured to slide along a sliding axis and including a latch and a tongue at a car body-engaging end of the latch;
    a groove block configured to be coupled to a car body of the vehicle, the groove block including a groove shaped to receive the tongue;
    a hook plate configured to be coupled to the car body; and
    a switch sensor,
    wherein the tongue of the threshold is configured to engage the groove to maintain alignment of the hook plate to mate with the latch to lock the threshold to the car body, the switch sensor configured to generate a signal indicating a locked state of the hook with the latch responsive to actuation of the switch sensor by the latch.

2. The locking device of claim 1, wherein the latch is located in a plane oriented substantially parallel to the sliding axis of the threshold and the latch is joined to the threshold at a joining axis transversely oriented to the sliding axis of the threshold.

3. The locking device of claim 2, wherein the latch is configured to rotate about the joining axis.

4. The locking device of claim 1, wherein the latch includes a hook-engaging end and a door panel-engaging end on opposite ends of the latch.

5. The locking device of claim 4, further comprising a resilient member coupled with the latch and configured to bias the latch into a default biased position where the door panel-engaging end of the latch is engaged with the door panel and the hook plate is engaged with the hook-engaging end of the latch.

6. The locking device of claim 4, wherein the latch is configured to pivot to disengage the latch from the door panel at the door panel-engaging end of the latch.

7. The locking device of claim 1, wherein the latch includes a pin elongated along an axis transversely oriented to the sliding axis, the latch including a retention plate coupled with an outer termination end of the pin.

8. The locking device of claim 7, wherein the retention plate is transversely oriented to the axis of the pin.

9. The locking device of claim 7, wherein the retention plate has a width in a direction that is parallel to the sliding axis that is no longer than a diameter of the pin.

10. The locking device of claim 7, wherein the hook plate includes a recessed notch positioned to receive the pin.

11. The locking device of claim 10, wherein a width of the notch in the hook plate is at least as large as a diameter of the pin.

12. The locking device of claim 10, wherein the hook plate has a thickness that is smaller than a length of the pin.

13. The locking device of claim 10, further comprising a resilient member coupled with the hook plate and configured to bias the hook plate such that a default position of the hook plate disengages the notch of the hook plate from the pin.

14. The locking device of claim 10, wherein the switch sensor is located such that the switch sensor is actuated by movement of the latch when the sliding threshold has locked with the car body by receipt of the pin in the notch of the hook plate.

15. The locking device of claim 7, wherein the groove block includes a three-dimensional groove shaped to receive the tongue of the threshold, the pin having a length defined by a depth of the groove, a maximum outboard and inboard horizontal play of the sliding threshold, and a thickness of the hook plate.

16. The locking device of claim 15, wherein the pin has a mid-point along the axis of the pin that is defined by a distance between the sliding axis and the latch, a thickness of the latch, the maximum outboard horizontal play of the sliding threshold, and the depth of the groove.

17. The locking device of claim 15, wherein the hook plate is located at a distance from the sliding axis so that a centerline of the hook plate is aligned with a mid-point of the pin when the tongue and the groove are mated.

18. The locking device of claim 7, wherein the groove block includes a groove shaped to receive the tongue of the threshold, wherein a first distance between a centerline of the tongue and the latch and a second distance from the axis of the latch and the axis of the pin at the car body-engaging end of the latch are defined such that the hook plate does not interfere with the retention plate of the latch or the latch when the tongue engages the groove, and the latch does not interfere with the groove block when the tongue engages the groove.

19. The locking device of claim 1, wherein the groove block includes a complimentary cavity shaped to receive a resilient bumper fixed to the groove block.

20. The locking device of claim 1, wherein the groove in the groove block is defined by a flat bottom surface transversely oriented to the sliding axis, a first angled surface intersecting an outboard edge of the bottom surface and projecting from the bottom surface at a first angle in an outboard direction, and a second angled surface intersecting an inboard edge of the bottom surface and projecting from the bottom surface at a second angle in an inboard direction.

21. A locking device for a vehicle sliding door assembly, the locking device comprising:
- a sliding door threshold configured to be mounted on a door panel, the threshold configured to slide along a sliding axis and including a latch and a tongue at a car body-engaging end of the latch;
- a groove block configured to be coupled to the car body, the groove block including a groove shaped to receive the tongue; and
- a hook plate configured to be coupled to the car body;
- wherein the tongue of the threshold is configured to engage the groove to maintain alignment of the hook plate to mate with the latch to lock the threshold to the car body.

22. A vehicle comprising:
- a car body;
- a door panel; and
- a locking device comprising:
  - a sliding door threshold mounted on the door panel, the threshold configured to slide along a sliding axis and including a latch and a tongue at a car body-engaging end of the latch;
  - a groove block coupled to the car body, the groove block including a groove shaped to receive the tongue; and
  - a hook plate coupled to the car body;
- wherein the tongue of the threshold is configured to engage the groove to maintain alignment of the hook plate to mate with the latch to lock the threshold to the car body.

* * * * *